United States Patent
Taillard et al.

(10) Patent No.: US 11,878,662 B2
(45) Date of Patent: Jan. 23, 2024

(54) WINDSCREEN WIPER DEVICE OF THE FLAT BLADE TYPE

(71) Applicants: TRICO BELGIUM S.A., Aubange (BE); AUDI A.G., Ingolstadt (DE); DR. ING. H.C. F. PORSCHE A.G., Weissach (DE); A. RAYMOND ET CIE SCS, Grenoble (FR); VOLKSWAGEN A.G., Wolfsburg (DE)

(72) Inventors: Arthur Taillard, Herserange (FR); Stephan Haefner, Ingolstadt (DE); Sven Auch, Stuttgart (DE); Frank Ackermann, Wolfsburg (DE); Karl Bode, Weil am Rhein (DE); Axel Feger, Lorrach (DE)

(73) Assignees: TRICO BELGIUM S.A.; AUDI A.G.; VOLKSWAGEN A.G.; A. RAYMOND ET CIE SCS; DR. ING. H.C. F. PORSCHE A.G.

( * ) Notice: Subject to any disclaimer, the term of this patent is extended or adjusted under 35 U.S.C. 154(b) by 0 days.

(21) Appl. No.: 17/858,019

(22) Filed: Jul. 5, 2022

(65) Prior Publication Data
US 2023/0009106 A1  Jan. 12, 2023

(30) Foreign Application Priority Data

Jul. 6, 2021 (EP) .................................. 21184044

(51) Int. Cl.
*B60S 1/40* (2006.01)
*B60S 1/04* (2006.01)
(Continued)

(52) U.S. Cl.
CPC ........... *B60S 1/4087* (2013.01); *B60S 1/0408* (2013.01); *B60S 1/0491* (2013.01); *B60S 1/4045* (2013.01);
(Continued)

(58) Field of Classification Search
CPC ...... B60S 1/522; B60S 1/4083; B60S 1/4087; B60S 1/0491; B60S 1/0408; B60S 1/3863;
(Continued)

(56) References Cited

U.S. PATENT DOCUMENTS

| | | | |
|---|---|---|---|
| 8,522,393 B2 * | 9/2013 | Boland | B60S 1/4083 15/250.32 |
| 8,850,653 B2 | 10/2014 | Depondt | |
| 2022/0250586 A1 * | 8/2022 | Haefner | B60S 1/522 |

FOREIGN PATENT DOCUMENTS

| | | |
|---|---|---|
| DE | 10228494 A1 | 1/2004 |
| WO | 2020/043264 A1 | 3/2020 |

(Continued)

*Primary Examiner* — Gary K. Graham
(74) *Attorney, Agent, or Firm* — Bryan Cave Leighton Paisner LLP

(57) ABSTRACT

A windscreen wiper device of the flat blade type comprising an elastic, elongated carrier element, as well as an elongated wiper blade of a flexible material, which can be placed in abutment with a windscreen to be wiped, which wiper blade includes at least one longitudinal slit, in which slit at least one longitudinal strip of the carrier element is disposed, which windscreen wiper device comprises a connecting device for a rod-like extension of an oscillating arm, wherein said rod-like extension can be pivotally connected to said connecting device about a pivot axis near a free end thereof, wherein said connecting device comprises a first part and a second part, wherein said rod-like extension of said oscillating arm can be pivotally connected to said first part about said pivot axis, with the interposition of said second part, wherein said first part is connected to said wiper blade and said second part is pivotally connected onto said first part, wherein said second part comprises a channel arranged to receive said free end of said rod-like extension, with the special feature that said windscreen wiper device comprises (Continued)

a housing for said rod-like extension, wherein said housing is arranged to be connected to said second part, and wherein said housing comprises a channel to receive said rod-like extension, said channel of said housing in mounted position being co-axial with said channel of said second part, wherein said first part and said second part are provided with mutually cooperating pivot means for pivotally connecting said second part to said first part, and wherein said first part engages said second part laterally from the outside at the location of said pivot axis.

21 Claims, 6 Drawing Sheets

(51) Int. Cl.
  *B60S 1/38* (2006.01)
  *B60S 1/52* (2006.01)

(52) U.S. Cl.
  CPC ........... *B60S 1/4083* (2013.01); *B60S 1/3862* (2013.01); *B60S 1/522* (2013.01); *B60S 2001/4054* (2013.01)

(58) Field of Classification Search
  CPC ...... B60S 2001/4054; B60S 2001/4045; B60S 1/4048; B60S 1/4045
  USPC .......................... 15/250.04, 250.43, 250.32
  See application file for complete search history.

(56) References Cited

FOREIGN PATENT DOCUMENTS

| WO | 2020/212322 | * 10/2020 |
| WO | 2020/212342 | * 10/2020 |

* cited by examiner

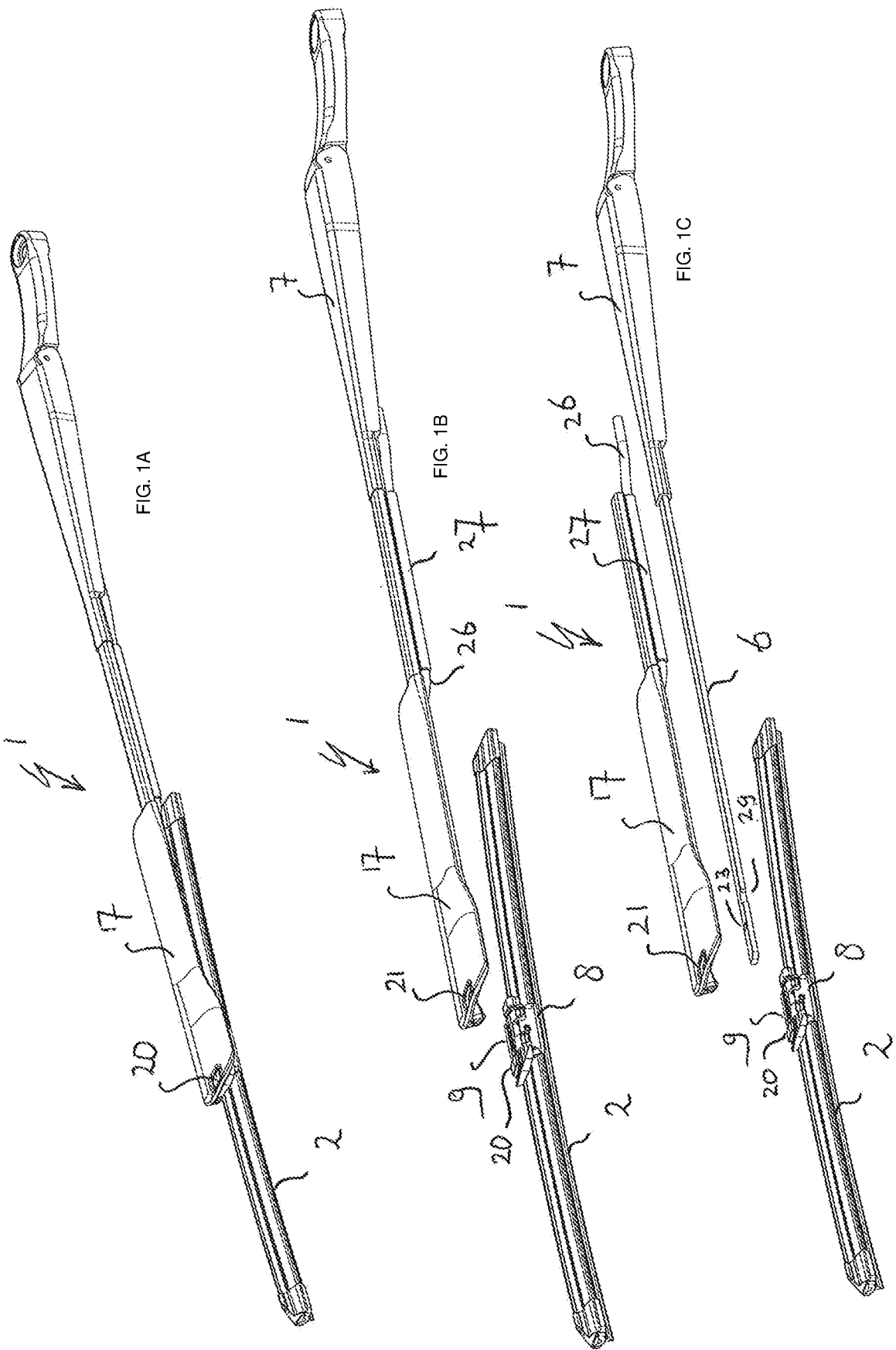

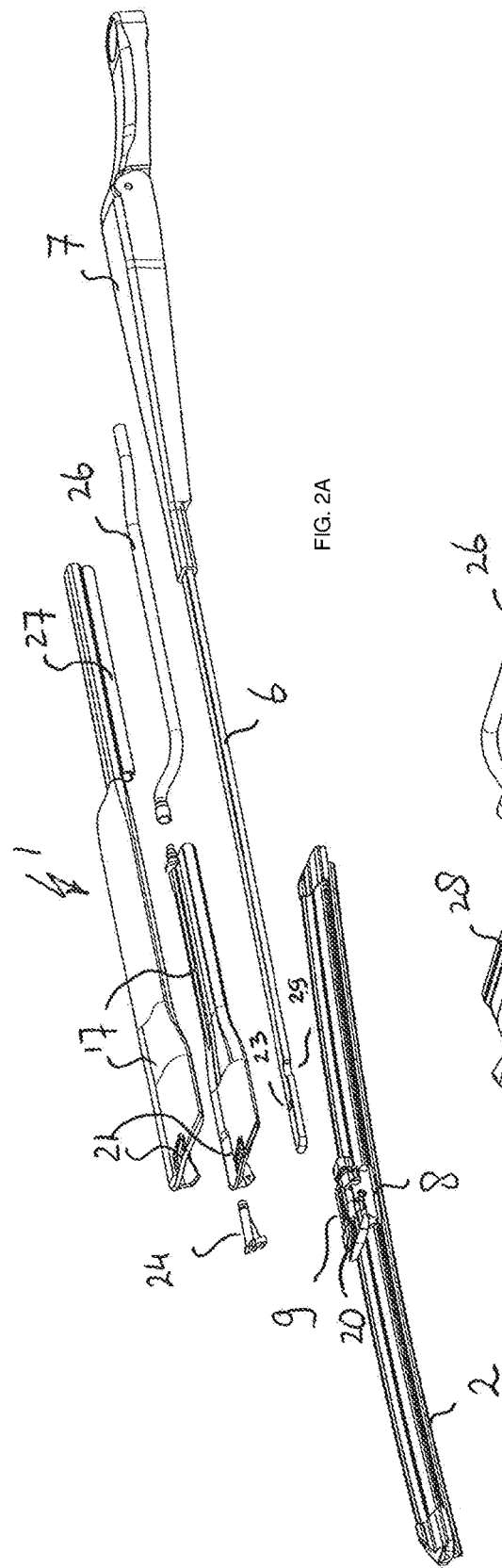
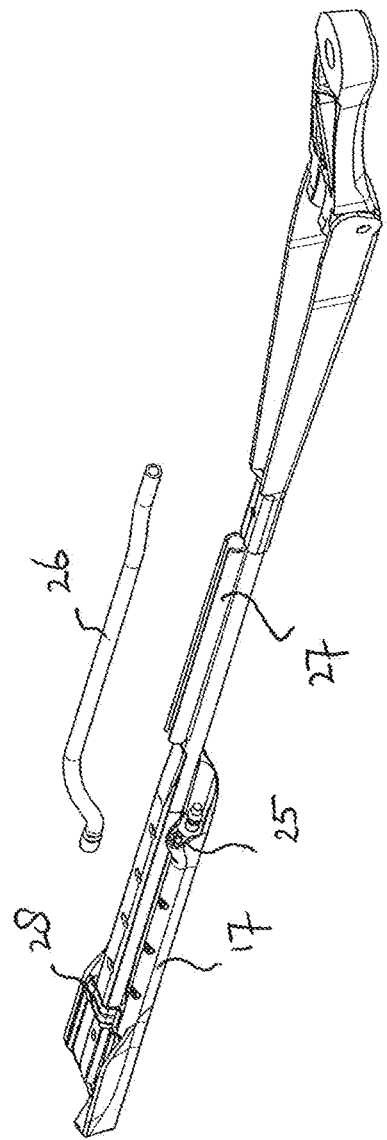
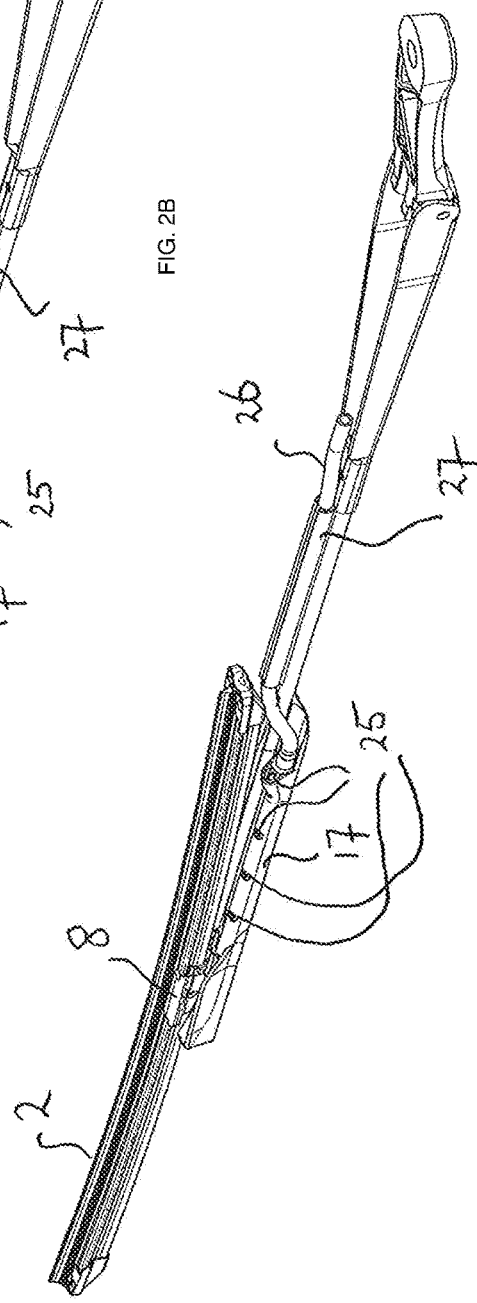
FIG. 2A
FIG. 2B
FIG. 2C

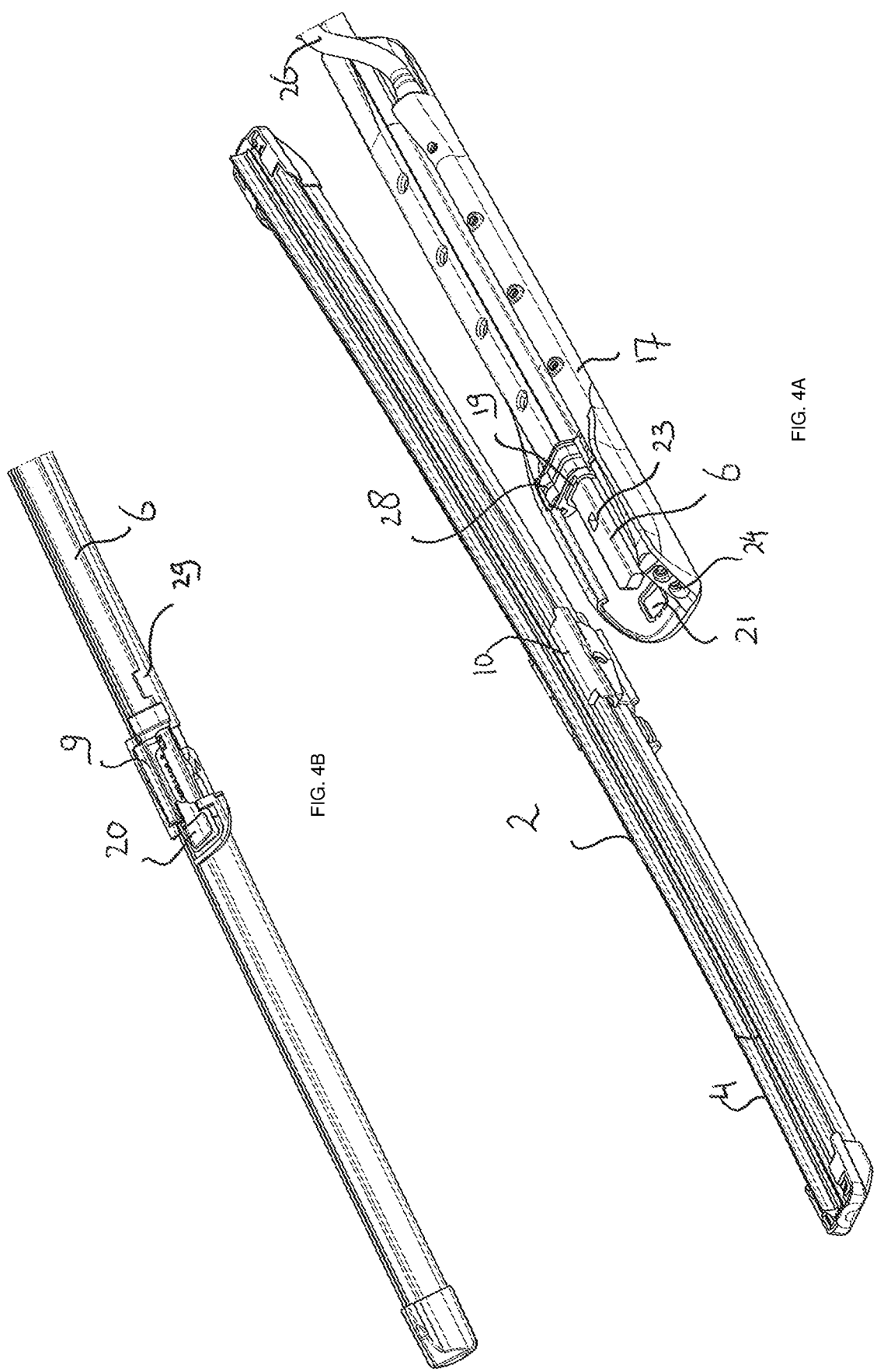

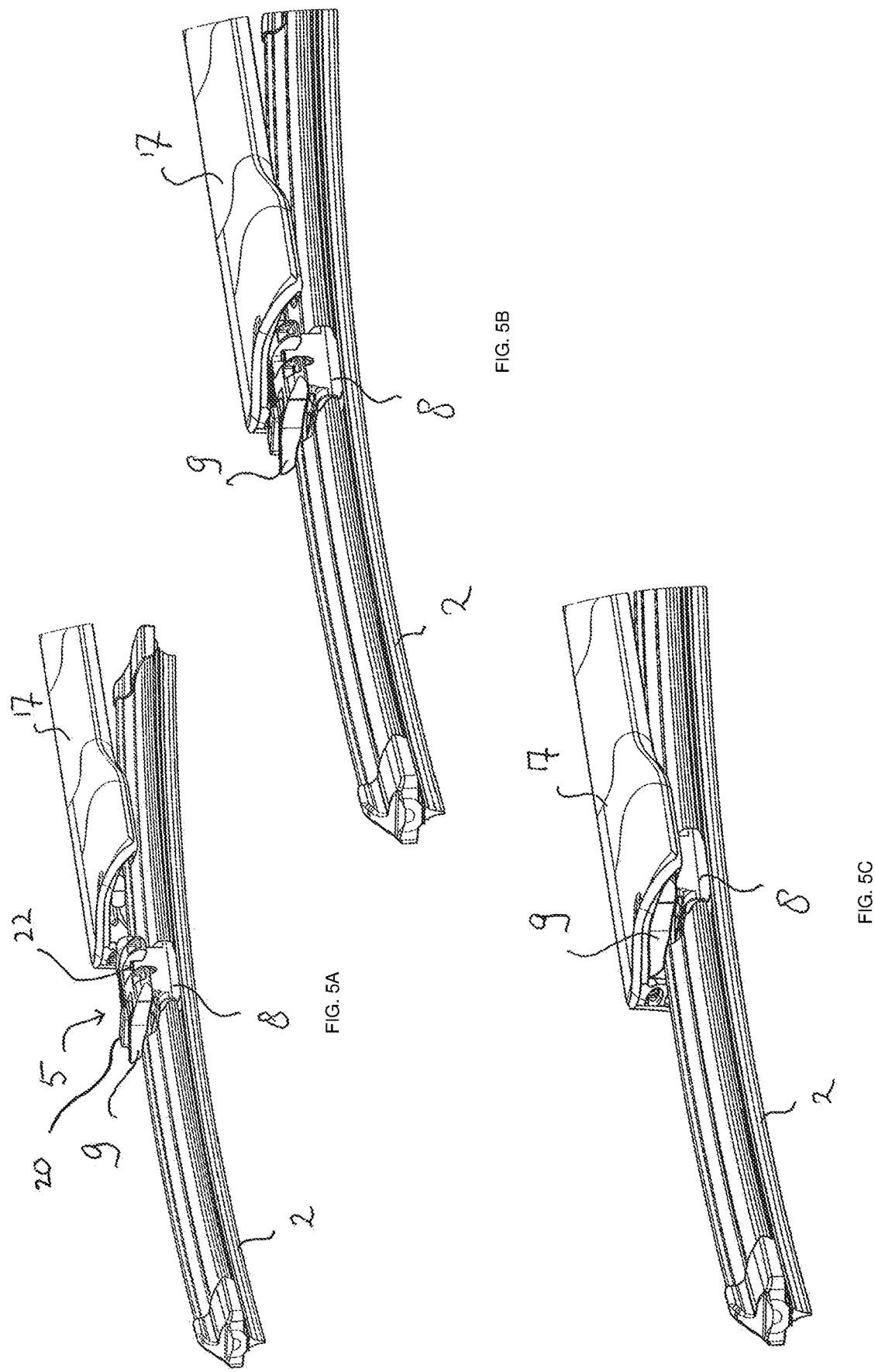

WINDSCREEN WIPER DEVICE OF THE FLAT BLADE TYPE

CROSS-REFERENCE TO RELATED APPLICATIONS

This application claims priority to European Application Number EP21184044.2 filed on Jul. 6, 2021. European Application Number EP21184044.2 is incorporated herein by reference in its entirety.

BACKGROUND

A windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. A disadvantage of the known windscreen wiper device is that it is often used in combination with a nozzle fixedly mounted on (or below) a bonnet of a car for spraying a washing liquid onto the car's windscreen to be wiped. In practice it has become apparent that the windscreen cannot effectively be cleaned by a combination of the oscillating arm and the nozzle, as the nozzle emits the washing fluid thereon at a large distance relative to the windscreen, so that a relatively large amount of the washing fluid does not effectively reach a wiping pattern on the windscreen to be wiped. Further, it has become apparent that in the prior art a large amount of liquid (consumption) is required in an attempt to clean the windscreen to be wiped. Further, if the washing fluid is spread onto the car's body instead of onto the windscreen to be wiped, it may damage the car. Indeed, ethanol, methanol and other components of the washing fluid are believed to have a corrosive effect on paint, rubber, car wax and plastics, for example. In order to overcome this disadvantage, it has been proposed to mount the nozzle onto the oscillating arm, so that the use (and replacement) of a simple and inexpensive wiper blade is also assured. However, mounting the nozzle onto the oscillating arm has the disadvantage that aerodynamic properties of the interconnection between the wiper blade and the rod-like extension are negatively influenced.

SUMMARY

The present invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal slit, in which slit at least one longitudinal strip of the carrier element is disposed, which windscreen wiper device comprises a connecting device for a rod-like extension of an oscillating arm, wherein the rod-like extension can be pivotally connected to said connecting device about a pivot axis near one end thereof, wherein said connecting device comprises a first part and a second part, wherein said rod-like extension of said oscillating arm can be pivotally connected to said first part about said pivot axis, with the interposition of said second part, wherein said first part is connected to said wiper blade and said second part is pivotally connected to said first part, wherein said second part comprises a channel arranged to receive said free end of said rod-like extension. Said longitudinal strip is also called a "flexor", while said connecting device is also indicated as a "connector". The slit may be open or closed. Preferably, said second part is also detachably connected to said first part.

Preferably, said wiper blade comprises a spoiler at a side thereof facing away from the windscreen to be wiped. The spoiler is also called an "air deflector" and is preferably made in one piece with said wiper blade through extrusion. Said longitudinal slit is preferably a central longitudinal slit accommodating said longitudinal strip. Said connecting device is preferably fixedly connected to the longitudinal strip(s) particularly through a welding, brazing ("soldering"), gluing or clamping operation or with the help of a pin inserted through said connecting device and said longitudinal strip(s). In the alternative or in addition thereto, said connecting device is clamped onto the flexible material of the wiper blade, particularly in case the latter is equipped with a central longitudinal slit for the carrier element. In the alternative or in addition thereto, said connecting device comprises a groove for accommodating said wiper blade and/or said longitudinal strip(s), wherein said groove comprises retention means for retaining said connecting device in place.

In use, said oscillating arm is connected to a mounting head mounted on a drive shaft, wherein said oscillating arm at one end thereof is pivotally connected to the mounting head by means of a pivot pin and at another end thereof is connected to said wiper blade placed in abutment with said windscreen to be wiped. In use, the shaft rotates alternately in a clockwise and in a counter-clockwise sense carrying the mounting head into rotation also, which in turn draws the oscillating arm into rotation and by means of said connecting device moves the wiper blade. Said oscillating arm can thus oscillate to-and-from between first and second reversal positions.

The present invention also relates to a connecting device arranged for use in such a windscreen wiper device.

It is noted that the present invention is not restricted to automobiles, but also refers to rail coaches and other (fast) vehicles.

It is an object of the invention to provide an improved windscreen wiper device, wherein these disadvantages are obviated, in the sense that at minimum costs—without using complex machinery and additional tools—an aerodynamic, but reliable and controllable interconnection between the wiper blade and the rod-like extension is realized, also in the event that a nozzle is mounted on the oscillating arm. More in particular, an object of the present invention is to propose an improved windscreen wiper device, wherein the oscillating arm and the nozzle are well integrated in the design of the arm, and wherein the aerodynamic performances of the arm are improved. Even more in particular, an object of the present invention is to propose an improved windscreen wiper device, wherein a lower design of the connecting device and the rod-like extension at the location of their interconnection is realized, wherein the second part is preferably not visible or only partly visible from inside an automobile, and wherein aerodynamic properties, particularly wind lift performance, of the wiper blade is improved.

In order to accomplish that objective, a windscreen wiper device of the type referred to in the introduction is characterized according to the invention in that said windscreen wiper device comprises a housing for said rod-like extension, wherein said housing is arranged to be connected to said second part, and wherein said housing comprises a channel to receive said rod-like extension, said channel of said housing in mounted position being co-axial with said channel of said second part, wherein said first part and said second part are provided with mutually cooperating pivot means for pivotally connecting said second part to said first part, and wherein said first part engages said second part laterally from the outside at the location of said pivot axis. Hence, as the second part is reinforced over its entire length by the rod-like extension, a rigid and low (i.e. aerodynamic) interconnection between the wiper blade and the rod-like extension is made possible. Said channels of said second part and of said housing preferably have a closed circumference. The second part being located inside the first part at the location of the pivot axis further contributes to a lower design and thus to an even better aerodynamic interconnection between the wiper blade and the rod-like extension. Particularly, said second part is positioned at least substantially inside said first part.

Preferably, said first and said second parts are each made in one piece of plastic material, wherein said first part is preferably made of hard, non deformable plastic and said second part is preferably made of soft, deformable plastic.

Preferably, said channel of said second part and said channel of said housing each have a length and a width, and wherein a plane extending in a direction of the width of each channel and a plane extending through said longitudinal strip along a width thereof at the location of the connecting device enclose an angle α, wherein α<10°, preferably 0°. In other words, in a transverse or cross-section of the windscreen wiper device, a centre line of the cross-sectional plane of each channel encloses the angle α with a symmetry axis of said longitudinal groove. Because of the angle α a very low design of the connecting device and the rod-like extension at the location of their interconnection.

In the framework of the present invention said oscillating arm is equipped with said rod-like extension preferably having a substantially rectangular cross-section, wherein said extension is to be inserted in the channels of the connecting device and of the housing, and wherein said extension has a non-twisted orientation (i.e. α<10°, preferably α=0°) relative to the oscillating arm preferably having a U-shaped cross-section. Such a non-twisted arm extension has proven to considerably reduce a height of the windscreen wiper device, whereas its design is attractive from a commercial perspective. Said channels preferably having a rectangular cross-section as well, have a non-twisted orientation corresponding to the non-twisted orientation of the arm extension in order to accommodate said arm extension during use. In other words, a bottom of each channel does extends parallel to a windscreen to be wiped (when the oscillating arm in one of said reversal positions is in a central region of the windscreen to be wiped and disregarding any small curvature thereof in that region); said bottom and said windscreen to be wiped enclose said angle α=0° in that region.

It is noted that the present invention is not restricted to the use of only one longitudinal strip forming the elastic carrier element that is particularly located in a central longitudinal slit or groove of the wiper blade. Instead, said carrier element may also comprise two longitudinal strips, wherein said strips are disposed in opposite longitudinal slits/grooves of the wiper blade. Said slit(s)/groove(s) may be closed at one outer end.

In a preferred embodiment of a windscreen wiper device in accordance with the invention said second part is connected to said first part by laterally outwardly extending protuberances of said second part, at the location of said pivot axis, pivotally engaging in recesses provided in said first part. Hence, a sturdy and reliably interconnection able to compensate high stresses is obtained. Said protuberances are particularly mutually spaced far apart, so as to reduce angular play and to reduce wear.

In another preferred embodiment of a windscreen wiper device according to the invention said protuberances are not allowed to bend inwardly after insertion of said rod-like extension into the channel of the second part. Preferably, opposite side-walls of said second part comprising said protuberances are bendable between a first position, wherein said first and second parts are connected together through a snapping operation, and a second position, wherein said first and second parts are released from each other after removal of said rod-like extension from the channel of the second part. Hence, upon mounting said second part on said first part or dismounting said second part from said first part, said protuberances are bent inwardly (i.e. the second position). Once mounted the protuberances are bend outwardly to snap inside the correspondingly shaped recesses inside the first part (i.e. in the first position). More preferably, said first part comprises opposite abutting walls for abutting from the outside against said side-walls of said second part. Preferably, during the snapping ("clipping") operation, the second part made of soft plastic is deformed, while the first part made of hard plastic is not deformed.

In another preferred embodiment of a windscreen wiper device in accordance with the invention said second part comprises a resilient tongue arranged to engage into a hole of said housing, and wherein said resilient tongue is hingeable along a hinge axis between an inward position retaining said wiper blade onto said rod-like extension and an outward position releasing said wiper blade from said rod-like extension. Said resilient tongue is preferably located near a free end of said second part facing away from said rod-like extension. Thus, when sliding the housing over the second part, the resilient tongue is not deformed until this sliding movement is (nearly) finished, so that fitting the wiper blade onto the rod-like extension is also not disturbed until then. Hence, this makes the blade assembly easier. Preferably, said housing has a U-shaped cross-section at the location of its connection to said second part, and wherein a base of said U-shaped cross-section is provided with said hole. Said hole preferably has a closed circumference.

In another preferred embodiment of a windscreen wiper device according to the invention said windscreen wiper device comprises first and second retention means for retaining said wiper blade onto said rod-like extension, wherein said first retention means comprises said resilient tongue on said second part and said hole in said housing, wherein said second retention means comprises at least one protrusion provided on the first part of said connecting device engaging the rod-like extension of the oscillating arm. In case these first retaining means would fail in actual practice, for example when the resilient tongue is not properly snapped into the hole, the second retaining means would serve to hold the wiper blade onto the rod-like extension after all and thus to avoid any undesired separation thereof, with all negative consequences involved, such as lost of the wiper blade. Preferably, said protrusion of said second retention means engages into a correspondingly shaped hole with an open or closed circumference provided in the rod-like extension. In the event that the first retaining means would break down in mounted position, any movement of the wiper blade relative to the housing, either towards the rod-like extension or away from said rod-like extension, is blocked by said protrusion abutting against opposite stop surfaces of said hole provided in said rod-like extension.

In another preferred embodiment of a windscreen wiper device in accordance with the invention, by pivoting said first part relative to said housing, said protrusion is disengaged from said hole, so that the wiper blade can be released from said rod-like extension. In other words, in such a pivoted position the protrusion is no longer accommodated between said stop surfaces and cannot cooperate therewith any longer.

In another preferred embodiment of a windscreen wiper device according to the invention said housing and said second part are arranged to be interconnected by sliding said housing onto said second part in longitudinal direction of said rod-like extension. Particularly, said channel of said second part is arranged to receive said free end of said rod-like extension upon sliding said housing onto said second part. More in particular, said second part is located inside said housing, i.e. is surrounded by said housing, after sliding said housing onto said second part. This means that said second part is invisible from the outside. Hence, the second part is reinforced over its entire length by the rod-like extension and the housing, so that a very rigid interconnection is obtained. This would result in less stress and thus in less wear and play.

In another preferred embodiment of a windscreen wiper device in accordance with the invention nozzles are integrated into, or otherwise mounted onto, said housing, wherein said nozzles are arranged to spray a cleaning liquid onto the windscreen to be wiped. Preferably, said housing comprises a soft portion being able to follow a bended portion of said rod-like extension. Hence, a conduit or pipe for supplying washing liquid towards the nozzle may be hidden from the outside. Preferably, the housing is composed of a hard plastic portion and a soft plastic portion, particularly made through injection moulding.

The present invention also relates to a housing for a rod-like extension of an oscillating arm arranged for use in such a windscreen wiper device.

BRIEF DESCRIPTION OF THE DRAWINGS

The invention will now be explained in more detail with reference to figures illustrated in a drawing, wherein:

FIG. 1A is a perspective view of a windscreen wiper device in an assembled position according to the invention FIG. 1B is a view of the windscreen wiper device in a partly disassembled position according to the invention;

FIG. 1C is a view of the windscreen wiper device in a partly disassembled position according to the invention;

FIG. 2A is a view of the windscreen wiper device in a disassembled position corresponding to FIG. 1C;

FIG. 2B is a perspective view from below the windscreen wiper device of FIG. 1a with a dismounted conduit for a cleaning liquid;

FIG. 2C is a perspective view from below the windscreen wiper device of FIG. 1A with amounted conduit for a cleaning liquid;

FIG. 4A is a perspective view from below the windscreen wiper device of FIG. 1A with a dismounted wiper blade;

FIG. 4B is a top view of a wiper blade connected to a rod-like extension of an oscillating arm;

FIG. 5A is a perspective view of a first step of how a wiper blade of the windscreen wiper device of FIG. 1A is mounted to an oscillating arm thereof;

FIG. 5B is a perspective view of a second step of how a wiper blade of the windscreen wiper device of FIG. 1A is mounted to an oscillating arm thereof;

FIG. 5C is a perspective view of a third step of how a wiper blade of the windscreen wiper device of FIG. 1A is mounted to an oscillating arm thereof.

DETAILED DESCRIPTION

Figure 3B:
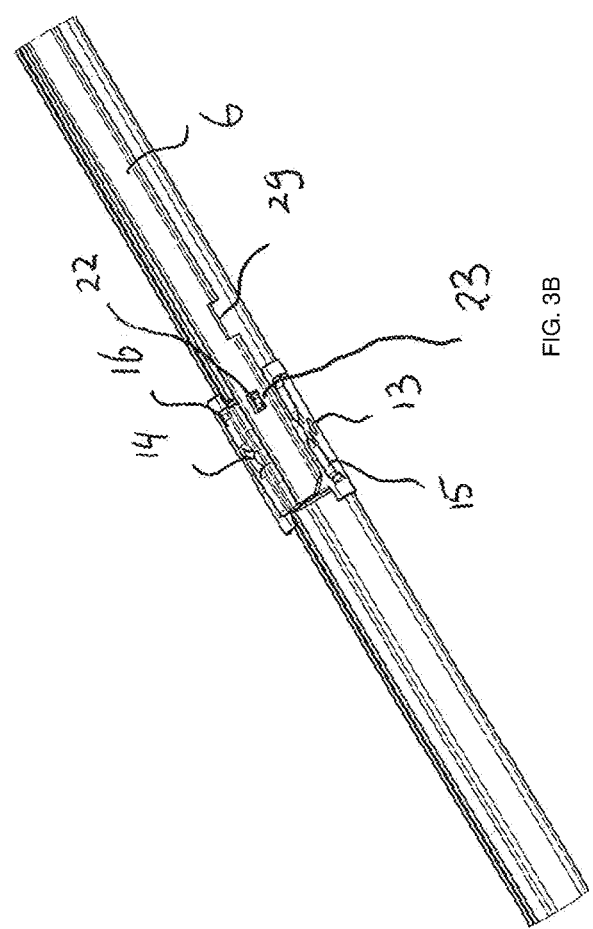
FIG. 3B is a top view of a wiper blade connected to a rod-like extension of an oscillating arm.
Figure 3A:
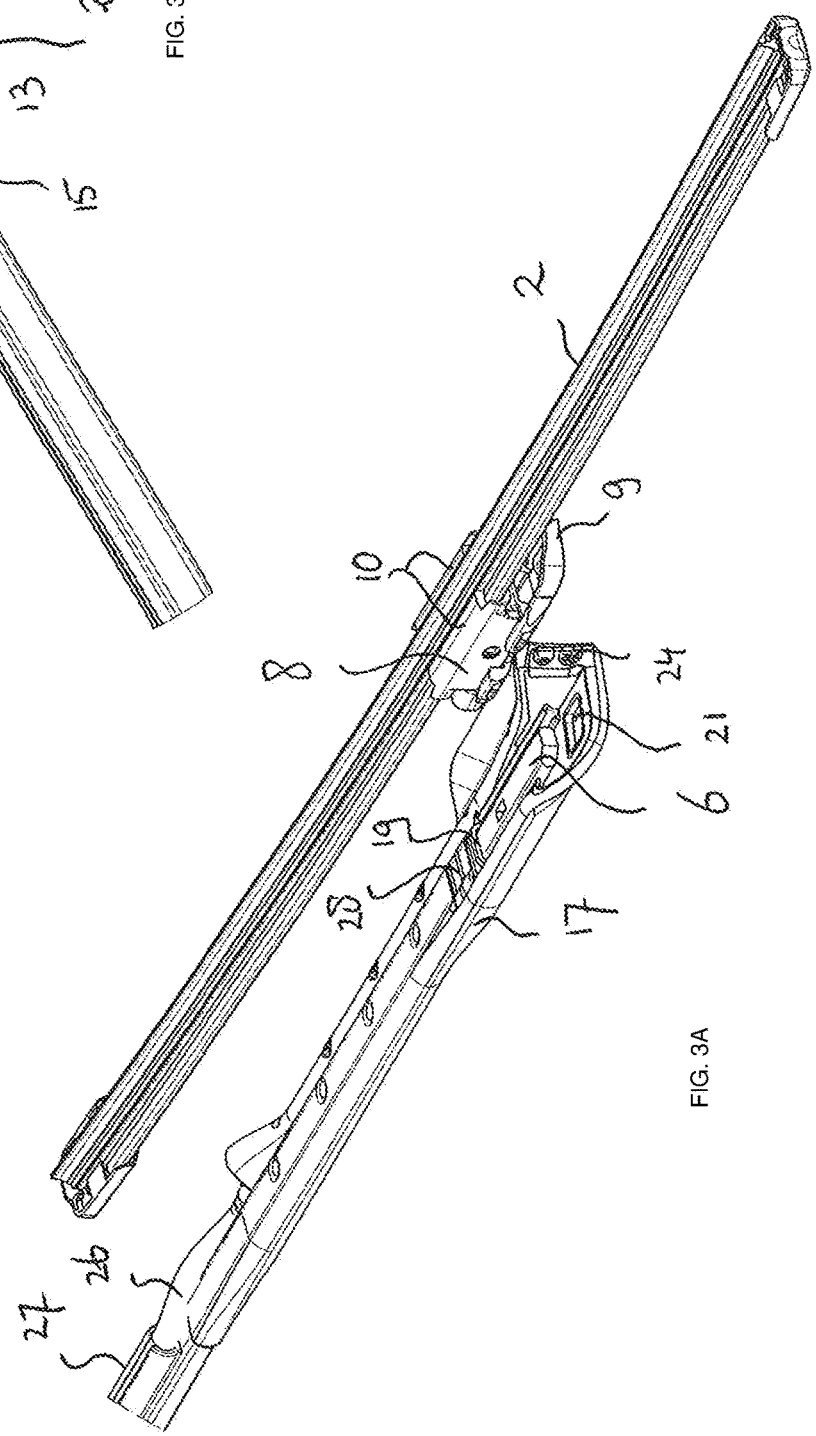
FIG. 3A is a perspective view from below the windscreen wiper device of FIG. 1A with a dismounted wiper blade.
Figure 6:
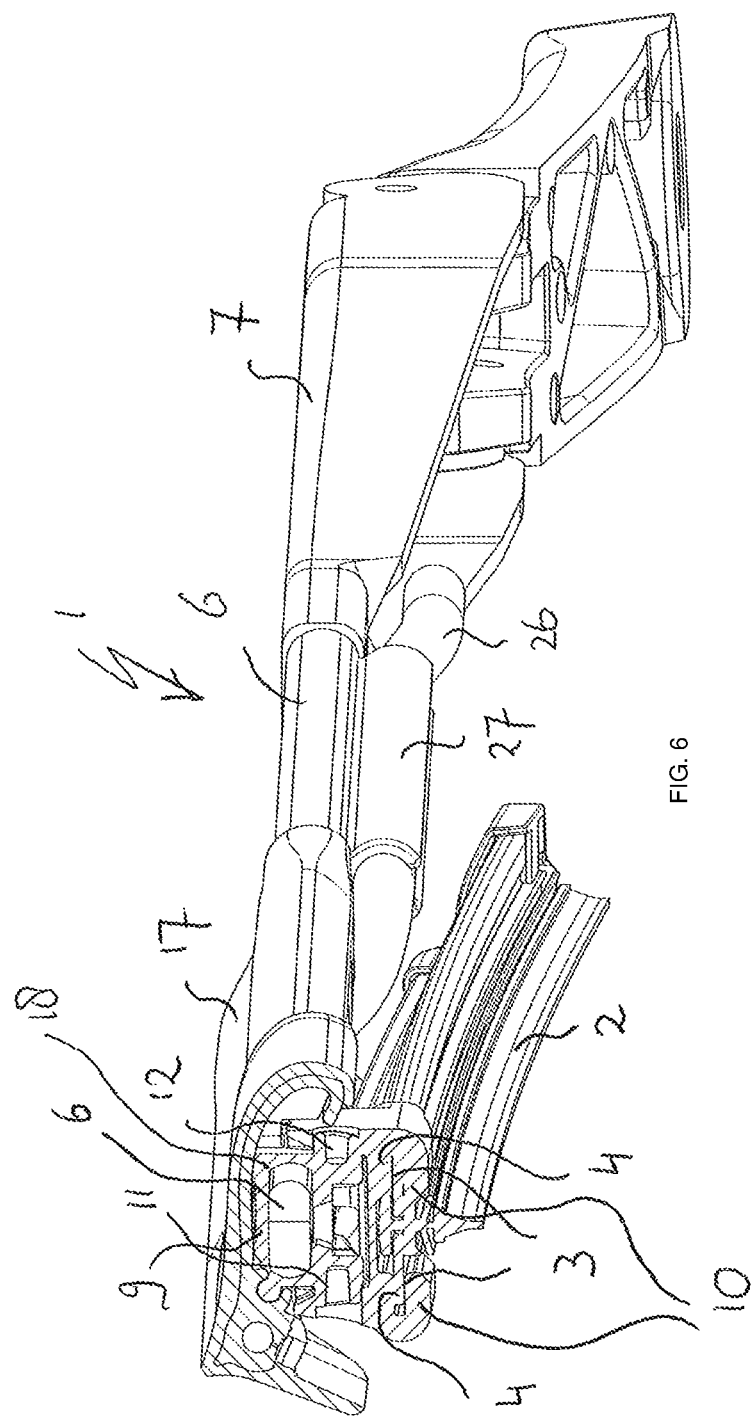
FIG. 6 is a perspective front view of the windscreen wiper device of FIG. 1A in assembled position.

FIGS. 1A-1C and 6 refer to a windscreen wiper device 1 of the flat blade type in accordance with the invention, built up of a wiper blade 2, in the longitudinal sides of which opposing longitudinal slits 3 are formed, and of longitudinal strips 4 ("flexors") made of spring band steel, which are fitted in said longitudinal slits 3. Said strips 4 form a flexible carrier element for the rubber wiper blade 2, as it were, which is thus biased in a curved position (the curvature in operative position being that of a windscreen to be wiped). As shown in FIGS. 1A-1C, 2A-2C, 3A-3B, 4A-4B, 5A-5C, and 6, the windscreen wiper device 1 is furthermore built up of a connecting device 5 of plastic material for a rod-like extension 6 of a windscreen wiper arm/oscillating arm 7. Said connecting device 5 comprises a first part 8 and a second part 9 acting as a joint part, wherein said rod-like extension 6 can be pivotally connected to said first part 8 about said pivot axis, with the interposition of said second part 9. With reference to FIGS. 3A-3B and 4A-4B, said first part 8 comprises inwardly extending legs 10 integral therewith engaging around longitudinal sides of the wiper blade 2, at the location of said grooves 3, as a result of which the first part 8 is firmly attached to the unit consisting of the wiper blade 2 and the strips 4. Said second part 9 comprises two cylindrical protuberances 11, 12 extending outwardly (FIG. 6). These protuberances 11, 12 pivotally engage, at the location of said pivot axis, in identically shaped recesses 13, 14 provided in opposite walls 15, 16 of the first part 9 (FIGS. 3A-3B). Hence, said second part 9 is connected to said first part 8 through a snapping/clipping operation. Said second part 9 is located inside the first part 8. As shown in FIGS. 1A-1C, 2A-2C, 3A-3B, 4A-4B, 5A-5C, and 6, said windscreen wiper device 1 further comprises a housing 17 arranged to accommodate said rod-like extension 6.

With reference to FIGS. 3A-3B, 4A-4B and 6 said second part 9 comprises a channel 18 arranged to receive (in a linear movement) said rod-like extension 6 of said oscillating arm 7, whereas said housing 17 also has a channel 19 for accommodating said rod-like extension 6. Both channels 18, 19 are co-axial. As shown, said channels 18, 19 extend parallel to a windscreen to be wiped, disregarding any small curvatures.

As shown in FIGS. 5A-5C, said housing 17 and said second part 9 are arranged to be interconnected by sliding said housing 17 onto said second part 9 in longitudinal direction of said rod-like extension 6, wherein said channel 18 of said second part 9 is arranged to receive said free end of said rod-like extension 6 upon sliding said housing 17 onto said second part 2. In assembled position (FIGS. 1A and 5C) said second part 9 is invisible from the outside inside said housing 17 after sliding said housing 17 onto said second part 9. In this assembled position a resilient tongue 20 on the second part 9 engages into a hole 21 in the housing 17. More precisely, said housing has a U-shaped cross-section at the location of its connection to the second part 9 and a base of said U-shaped cross-section comprises said hole 21. The resilient tongue 20 and the hole 21 together act as first retention means in this case, i.e. to retain the unit consisting of the wiper blade 2 and the connecting device 5 onto the rod-like extension 6. Said resilient tongue 20 is hingeable along a hinge axis between an inward position retaining said second part 9 (together with the first part 8 and the wiper blade 2 attached thereon) onto said rod-like extension 6, and an outward position releasing second part 9 (together with the first part 8 and the wiper blade 2 attached thereon) from said rod-like extension 6. Said resilient tongue is hingeable (i.e. activated and deactivated) from said inward position into said outward position by a hand, as if it were a push button. This is a so-called bayonet connection.

In case of any unforeseen failure of the bayonet connection acting as first retention means, second retention means are provided for. These second retention means in this case comprise at least one protrusion 22 provided on the first part 8 of said connecting device 5 engaging the rod-like extension 6 of the oscillating arm 7. In case these first retaining means would fail in actual practice, for example when the resilient tongue 20 is not properly snapped into the hole 21, the second retaining means would serve to hold the wiper blade 2 onto the rod-like extension 6 after all and thus to avoid any undesired separation thereof, with all negative consequences involved, such as lost of the wiper blade 2. Preferably, said protrusion 22 of said second retention means engages into a correspondingly shaped hole 23 with closed circumference (in the alternative, an open circumference) provided in the rod-like extension 6 (FIGS. 1C, 2A, 3B, 4B and 5A). In the event that the first retaining means would break down in mounted position, any movement of the wiper blade 2 relative to the housing 17, either towards the rod-like extension 6 or away from said rod-like extension 6, is blocked by said protrusion 22 abutting against opposite stop surfaces of said hole 23 provided in said rod-like extension 6. For dismounting the connecting device 5 from the rod-like extension 6, the second part 9 (and thus the free end of the rod-like extension 6 connected thereto), is pivoted relative to the first part 8. While carrying out the pivot movement, the protrusion 22 is disengaged from the hole 23, so that the second part 9 and the first part 8 attached thereto can be released from the rod-like extension 6, of course after the resilient tongue 20 has been pushed in. As far as mounting is concerned, while carrying out the pivot movement, the protrusion 22 engages into the hole 23 (i.e. so that these are in line with each other), so that the second part 9 and the first part 8 attached thereto is retained onto the rod-like extension 6 (working position). The mutually cooperating protrusion/hole 22, 23 act as second retention means in case first retention means, as explained above, would inadvertently fail.

Optionally, the housing 17 is equipped with nozzle 24, 25 arranged to spray cleaning liquid onto a windscreen to be wiped (FIGS. 2A-2C, 3A-3B and 4A-4B). The nozzles 24, 25 are preferably integrated into a leg of the U-shaped cross-section of said housing 17 that in use faces away from or faces towards a downward reversal position of the oscillating arm 7. A flexible conduit 26 clipped from below into an elongated holder 27 is provided for transporting cleaning liquid towards the nozzles 24, 25 (FIGS. 1A-1C, 2A-2C and 3A-3B). The holder 27 extending in longitudinal direction is attached to the rod-like extension 6 of the oscillating arm 7. An extra clip 28 is arranged in the housing 17 to retain the rod-like extension 6 onto the housing 17 (FIGS. 2A-2C, 3A-3B and 4A-4B), wherein said clip 28 can be open and closed to facilitate (dis)mounting onto/from the housing 17. In closed position the clip 28 rests inside a recess 29 on an exterior longitudinal side of the rod-like extension 6. The housing 17 is thus located on the extension 6 by the clip 28 using the recess 29 of the arm extension 6. In the prior art a windscreen wiper device is often used in combination with a nozzle fixedly mounted on (or below) a bonnet of a car for spraying a washing liquid onto the car's windscreen to be wiped. In practice it has become apparent that the windscreen cannot effectively be cleaned by a combination of the oscillating arm and the nozzle, as the nozzle emits the washing fluid thereon at a large distance relative to the windscreen, so that a relatively large amount of the washing fluid does not effectively reach a wiping pattern on the windscreen to be wiped. Further, it has become apparent that in the prior art a large amount of liquid (consumption) is required in an attempt to clean the windscreen to be wiped. Further, if the washing fluid is spread onto the car's body instead of onto the windscreen to be wiped, it may dirty the car. Indeed, ethanol, methanol and other components of the washing fluid are able to leave marks/spots on the car body and plastics, for example. By now mounting the nozzle onto the housing 17 a windscreen to be wiped can be effectively cleaned, without making parts of a car dirty, wherein less washing liquid is required to clean the windscreen to be wiped.

The invention is not restricted to the preferred embodiments shown in the figures, but extends also to other preferred variants within the scope of the appended claims.

The invention claimed is:

1. A windscreen wiper device comprising an elastic, elongated carrier element, as well as an elongated wiper blade of a flexible material, which can be placed in abutment with a windscreen to be wiped,
   the wiper blade includes at least one longitudinal slit, in which slit at least one longitudinal strip of the carrier element is disposed, which windscreen wiper device comprises a connecting device for a rod-shaped extension of an oscillating arm, wherein said rod-shaped extension can be pivotally connected to said connecting device about a pivot axis near a free end thereof,
   wherein said connecting device comprises a first part and a second part, wherein said rod-shaped extension of said oscillating arm can be pivotally connected to said first part about said pivot axis, with the interposition of said second part, wherein said first part is connected to said wiper blade and said second part is pivotally connected onto said first part, wherein said second part comprises a channel arranged to receive said free end of said rod-shaped extension,
   said windscreen wiper device comprises a housing for said rod-shaped extension, wherein said housing is arranged to be connected to said second part, and wherein said housing comprises a channel to receive said rod-shaped extension, said channel of said housing in mounted position being co-axial with said channel of said second part, wherein said first part and said second part are provided with mutually cooperating pivot means for pivotally connecting said second part to said first part, and wherein said first part engages said second part laterally from the outside at the location of said pivot axis;
   said windscreen wiper device comprises a two-part retention mechanism for securing the rod-shaped extension to the connecting device, said two-part retention mechanism comprising a first retention means and a second retention means;
   said first retention means comprising a bayonet connection formed by connection of a resilient tongue arranged on the second part of said connecting device with a first hole arranged on said housing, wherein said resilient tongue is hingeable along a hinge axis between an inward position retaining said wiper blade onto said rod-shaped extension and an outward position releasing said wiper blade from said rod-shaped extension; and said second retention means comprises a second connection formed by at least one protrusion arranged on the first part of said connecting device and a second hole formed in the rod-shaped extension, wherein the at least one protrusion extends away from the first part of the connection device in a direction opposite from the wiper blade.

2. The windscreen wiper device according to claim 1, wherein said second part is connected to said first part by laterally outwardly extending protuberances of said second part, at the location of said pivot axis, pivotally engaging in recesses provided in said first part.

3. The windscreen wiper device according to claim 2, wherein said protuberances are not allowed to bend inwardly after insertion of said rod-shaped extension into the channel of the second part.

4. The windscreen wiper device according to claim 2, wherein opposite side-walls of said second part comprising said protuberances are bendable between a first position, wherein said first and second parts are connected together through a snapping operation, and a second position, wherein said first and second parts are released from each other only after removal of said rod-shaped extension from the channel of the second part.

5. The windscreen wiper device according to claim 4, wherein said first part is made of a hard, non deformable plastic and said second part is made of a soft, deformable plastic.

6. The windscreen wiper device according to claim 4, wherein said first part comprises opposite abutting walls for abutting from the outside against said side-walls of said second part.

7. The windscreen wiper device according to claim 1, wherein said second part is positioned at least substantially inside said first part.

8. The windscreen wiper device according to claim 1, wherein said resilient tongue is located near a free end of said second part facing away from said rod-shaped extension.

9. The windscreen wiper device according to claim 1, wherein said housing has an U-shaped cross-section at the location of its connection to said second part, and wherein a base of said U-shaped cross-section is provided with said first hole.

10. The windscreen wiper device according to claim 1, wherein said first hole has a closed circumference.

11. The windscreen wiper device according to claim 1, wherein said at least one protrusion engages into a correspondingly shaped second hole with a closed circumference provided on a longitudinal side of the rod-shaped extension.

12. The windscreen wiper device according to claim 11, wherein, by pivoting said first part relative to said housing, said protrusion is disengaged from said hole, so that the wiper blade can be released from said rod-shaped extension.

13. The windscreen wiper device according to claim 1, wherein said housing and said second part are arranged to be interconnected by sliding said housing onto said second part in longitudinal direction of said rod-shaped extension.

14. The windscreen wiper device according to claim 13, wherein said channel of said second part is arranged to receive said free end of said rod-shaped extension upon sliding said housing onto said second part.

15. The windscreen wiper device according to claim 13, wherein said second part is located inside said housing after sliding said housing onto said second part.

16. The windscreen wiper device according to claim 1, wherein said channel of said second part and said channel of said housing in mounted position abut each other to block any movement of said wiper blade relative to said housing in a longitudinal direction towards said rod-shaped extension.

17. The windscreen wiper device according to claim 1, wherein a nozzle is integrated into said housing.

18. The windscreen wiper device according to claim 1, wherein said housing comprises a soft portion being able to follow a bended portion of said rod-shaped extension.

19. The windscreen wiper device according to claim 1, wherein said rod-shaped extension is not twisted relative to a windscreen to be wiped.

20. The windscreen wiper device according to claim 1, wherein a clip on the housing being movable between an open and a closed position is provided, said clip retaining the housing on the rod-shaped extension in the closed position and resting in a recess on an exterior longitudinal side of the rod-shaped extension.

21. The windscreen wiper device according to claim 1, wherein:
the resilient tongue of the first retention means extends upwardly from second part of the connecting device in a direction opposite from the wiper blade;
in connecting the housing to the connecting device, the housing is slid in a longitudinal direction of said rod-shaped extension towards the second part of the connecting device and the bayonet connection is formed by the resilient tongue extending upwardly through the first hole in the housing situated on top of the second part of the connecting device; and
in a working position in which the resilient tongue engages the first hole to retain the housing and rod-shaped extension to the connecting device on the wiper blade, the housing surrounds the second part of the connecting device and the second part of the connecting device is concealed by the housing.

* * * * *